United States Patent
Mannava et al.

(10) Patent No.: US 10,795,820 B2
(45) Date of Patent: Oct. 6, 2020

(54) READ TRANSACTION TRACKER LIFETIMES IN A COHERENT INTERCONNECT SYSTEM

(71) Applicant: ARM Limited, Cambridge (GB)

(72) Inventors: Phanindra Kumar Mannava, Austin, TX (US); Bruce James Mathewson, Papworth Everard (GB); Jamshed Jalal, Austin, TX (US); Tushar P Ringe, Austin, TX (US)

(73) Assignee: ARM Limited, Cambridge (GB)

( * ) Notice: Subject to any disclaimer, the term of this patent is extended or adjusted under 35 U.S.C. 154(b) by 559 days.

(21) Appl. No.: 15/427,435

(22) Filed: Feb. 8, 2017

(65) Prior Publication Data
US 2018/0225206 A1     Aug. 9, 2018

(51) Int. Cl.
*G06F 12/0831*    (2016.01)
*G06F 11/14*    (2006.01)

(52) U.S. Cl.
CPC ...... *G06F 12/0835* (2013.01); *G06F 11/1474* (2013.01); *G06F 2201/88* (2013.01); *G06F 2212/621* (2013.01)

(58) Field of Classification Search
CPC ........ G06F 12/0835; G06F 1/00–3296; G06F 3/00; G06F 3/06–0689; G06F 5/00–16;
(Continued)

(56) References Cited

U.S. PATENT DOCUMENTS 5,197,146 A * 3/1993 LaFetra ............... G06F 12/0824
711/120

5,504,874 A * 4/1996 Galles ....................... G06F 9/52
709/226

(Continued)

OTHER PUBLICATIONS

Nicolai Oswald, Vijay Nagarajan, and Daniel J. Sorin. 2018. Protogen: automatically generating directory cache coherence protocols from atomic specifications. In Proceedings of the 45th Annual International Symposium on Computer Architecture (ISCA '18). IEEE Press, 247-260. (Year: 2018).*

(Continued)

*Primary Examiner* — Daniel C. Chappell
(74) *Attorney, Agent, or Firm* — Nixon & Vanderhye P.C.

(57) ABSTRACT

Apparatus and a corresponding method of operating the apparatus, in a coherent interconnect system comprising a requesting master device and a data-storing slave device, are provided. The apparatus maintains records of coherency protocol transactions received from the requesting master device whilst completion of the coherency protocol transactions are pending and is responsive to reception of a read transaction from the requesting master device for a data item stored in the data-storing slave device to issue a direct memory transfer request to the data-storing slave device. A read acknowledgement trigger is added to the direct memory transfer request and in response to reception of a read acknowledgement signal from the data-storing slave device a record created by reception of the read transaction is updated corresponding to completion of the direct memory transfer request. The lifetime that the apparatus needs to maintain the record is thus reduced, despite the read transaction being satisfied by a direct memory transfer. A corresponding data-storing slave device and method of operating the data-storing slave device are also provided.

18 Claims, 7 Drawing Sheets

(58) Field of Classification Search
CPC ........... G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2003/0691–0698; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153
See application file for complete search history.

(56) References Cited

U.S. PATENT DOCUMENTS

| | | | | |
|---|---|---|---|---|
| 5,664,149 | A * | 9/1997 | Martinez, Jr. | G06F 12/0804 711/135 |
| 5,696,910 | A * | 12/1997 | Pawlowski | G06F 13/4217 709/224 |
| 5,953,538 | A * | 9/1999 | Duncan | G06F 13/4027 710/22 |
| 6,014,690 | A * | 1/2000 | VanDoren | G06F 12/0813 709/201 |
| 6,622,216 | B1 * | 9/2003 | Lin | G06F 12/0831 711/141 |
| 6,681,293 | B1 * | 1/2004 | Solomon | G06F 12/0811 711/120 |
| 6,862,646 | B2 * | 3/2005 | Bonola | G06F 12/0815 370/402 |
| 7,734,857 | B2 * | 6/2010 | Saripalli | G06F 12/0815 710/311 |
| 8,185,602 | B2 * | 5/2012 | Watson, Jr. | G06F 15/17337 709/217 |
| 9,916,247 | B2 * | 3/2018 | Steinmacher-Burow | G06F 12/0817 |
| 10,255,189 | B2 * | 4/2019 | Bradbury | G06F 9/467 |
| 10,489,323 | B2 * | 11/2019 | Geng | G06F 13/4282 |
| 10,649,684 | B2 * | 5/2020 | Blake | G06F 3/0604 |
| 10,664,399 | B2 * | 5/2020 | Persson | G06F 12/0833 |
| 2006/0080508 | A1 * | 4/2006 | Hoover | G06F 12/0822 711/133 |
| 2007/0079075 | A1 * | 4/2007 | Collier | G06F 12/082 711/141 |
| 2007/0143550 | A1 * | 6/2007 | Rajwar | G06F 12/0811 711/146 |
| 2010/0064108 | A1 * | 3/2010 | Harris | G06F 12/0831 711/146 |
| 2011/0202726 | A1 * | 8/2011 | Laycock | G06F 12/0815 711/122 |
| 2014/0052905 | A1 * | 2/2014 | Lih | G06F 12/0831 711/105 |
| 2015/0220461 | A1 * | 8/2015 | Auernhammer | G06F 13/4027 710/310 |
| 2016/0055085 | A1 * | 2/2016 | Salisbury | G06F 12/0831 711/146 |
| 2016/0350115 | A1 * | 12/2016 | Tonnerre | G06F 9/384 |
| 2018/0225206 | A1 * | 8/2018 | Mannava | G06F 12/0835 |
| 2018/0225214 | A1 * | 8/2018 | Mannava | G06F 12/0835 |
| 2020/0167284 | A1 * | 5/2020 | Jalal | G06F 12/0815 |

OTHER PUBLICATIONS

Francisco Perez-Sorrosal, Marta Patiño-Martinez, Ricardo Jimenez-Peris, and Bettina Kemme. 2011. Elastic Sl-Cache: consistent and scalable caching in multi-tier architectures. The VLDB Journal 20, 6 (Dec. 2011), 841-865. (Year: 2011).*

I. Eyal, K. Birman and R. v. Renesse, "Cache Serializability: Reducing Inconsistency in Edge Transactions," 2015 IEEE 35th International Conference on Distributed Computing Systems, Columbus, OH, 2015, pp. 686-695 (Year: 2015).*

Colin Blundell, Joe Devietti, E. Christopher Lewis, and Milo M. K. Martin. 2007. Making the fast case common and the uncommon case simple in unbounded transactional memory. In Proceedings of the 34th annual international symposium on Computer architecture (ISCA '07). 24-34. (Year: 2007).*

Yi Xu, Yu Du, Youtao Zhang, and Jun Yang. 2011. A composite and scalable cache coherence protocol for large scale CMPs. In Proceedings of the international conference on Supercomputing (ICS '11). 285-294. (Year: 2011).*

International Search Report and Written Opinion of the International Searching Authority dated May 2, 2018 in PCT/GB2018/050226, 12 pages.

* cited by examiner

READ TRANSACTION TRACKER LIFETIMES IN A COHERENT INTERCONNECT SYSTEM

TECHNICAL FIELD

The present disclosure relates to data processing systems. More particularly it relates to a coherent interconnect system in which coherency protocol transactions are exchanged.

BACKGROUND

In a data processing system which comprises a coherent interconnect, in which components of the system exchange coherency protocol transactions, careful administration of those transactions and the data processing operations which they provoke is necessary in order to maintain the desired coherency within the system. As one part of this administration an apparatus in the system may maintain records of certain transactions, where the corresponding record is maintained whilst the transaction is pending and is removed once the transaction is complete.

SUMMARY

At least one example described herein provides an apparatus for a coherent interconnect system comprising: interface circuitry to receive coherency protocol transactions from a requesting master device and to exchange further coherency protocol transactions with a data-storing slave device; transaction tracking circuitry to maintain records of the coherency protocol transactions received from the requesting master device whilst completion of the coherency protocol transactions are pending; and transaction control circuitry responsive to reception at the interface circuitry of a read transaction of the coherency protocol transactions from the requesting master device for a data item stored in the data-storing slave device to issue a direct memory transfer request to the data-storing slave device, wherein the direct memory transfer request comprises a read acknowledgement trigger to solicit a read acknowledgement signal from the data storing slave device, and wherein the transaction tracking circuitry is responsive to reception at the interface circuitry of the read acknowledgement signal from the data-storing slave device to update a record in the transaction tracking circuitry created by reception of the read transaction to indicate completion of the direct memory transfer request.

At least one example described herein provides a method of operating an apparatus in a coherent interconnect system comprising the steps of: receiving a read transaction of a set of coherency protocol transactions from a requesting master device for a data item stored in a data-storing slave device; maintaining records of coherency protocol transactions received from the requesting master device whilst completion of the coherency protocol transactions are pending; issuing a direct memory transfer request to the data-storing slave device in response to reception of the read transaction, wherein the direct memory transfer request comprises a read acknowledgement trigger to solicit a read acknowledgement signal from the data storing slave device; and updating a record created by reception of the read transaction to indicate completion of the direct memory transfer request in response to reception of the read acknowledgement signal from the data-storing device.

At least one example described herein provides an apparatus, for a coherent interconnect system comprising a requesting master device and a data-storing slave device, wherein the apparatus comprises: means for receiving coherency protocol transactions from the requesting master device; means for exchanging further coherency protocol transactions with the data-storing slave device; means for maintaining records of the coherency protocol transactions received from the requesting master device whilst completion of the coherency protocol transactions are pending; means for issuing a direct memory transfer request to the data-storing slave device in response to reception of a read transaction from the requesting master device for a data item stored in the data-storing device, wherein the direct memory transfer request comprises a read acknowledgement trigger; and means for updating a record in the means for maintaining records created by reception of the read transaction corresponding to completion of the direct memory transfer request in response to reception of a read acknowledgement signal from the data-storing device.

At least one example described herein provides a data-storing slave device for a coherent interconnect system comprising: interface circuitry to exchange coherency protocol transactions with a hub device and to exchange further coherency protocol transactions with a master device; and transaction control circuitry responsive to reception of a direct memory transfer request from the hub device comprising a read acknowledgement trigger to transmit a read acknowledgement signal to the hub device and to transmit data specified in the direct memory transfer request directly to the master device.

At least one example described herein provides a method of operating a data-storing slave device in a coherent interconnect system comprising the steps of: receiving a direct memory transfer request from a hub device; when the direct memory transfer request comprising a read acknowledgement trigger, transmitting a read acknowledgement signal to the hub device; and transmitting data specified in the direct memory transfer request directly to the master device.

BRIEF DESCRIPTION OF THE DRAWINGS

The present techniques will be described further, by way of example only, with reference to embodiments thereof as illustrated in the accompanying drawings, in which.

DESCRIPTION OF EXAMPLE EMBODIMENTS

In some example embodiments there is an apparatus for a coherent interconnect system comprising: interface circuitry to receive coherency protocol transactions from a requesting master device and to exchange further coherency protocol transactions with a data-storing slave device; transaction tracking circuitry to maintain records of the coherency protocol transactions received from the requesting master device whilst completion of the coherency protocol transactions are pending; and transaction control circuitry responsive to reception at the interface circuitry of a read transaction of the coherency protocol transactions from the requesting master device for a data item stored in the data-storing slave device to issue a direct memory transfer request to the data-storing slave device, wherein the direct memory transfer request comprises a read acknowledgement trigger to solicit a read acknowledgement signal from the data storing slave device, and wherein the transaction tracking circuitry is responsive to reception at the interface circuitry of the read acknowledgement signal from the data-storing slave device to update a record in the transaction tracking circuitry created by reception of the read transaction to indicate completion of the direct memory transfer request.

The apparatus, which receives a read transaction from a requesting master device and causes the requested data stored in a data-storing slave device to be retrieved and returned to the requesting master device thus plays the role of a "home node" or "hub device" in the system. The transaction tracking circuitry (also sometimes simply referred to herein as the "tracker") in the apparatus enables it to administer and monitor the coherency protocol transactions being exchanged in the system and in particular to ensure that each transaction is observed to complete correctly. However, playing the role of this "home" device places a certain burden on the apparatus in terms of the storage which must be maintained in the tracker to hold entries for all currently pending transactions and also in that the apparatus must mediate the data retrieved from the data-storing slave device in response to the read request. It is therefore preferable, where possible, for the apparatus to instruct the data-storing slave device to directly transfer the data to the requesting master (i.e. the apparatus issues a "direct memory transfer request" to the data-storing slave device specifying the requesting master device as the target). However, this approach could present a difficulty in that the home node would not know when to mark the entry in its tracker as complete (also referred to herein as deallocating the request in the tracker) since there is no indication received by the home node of the request being processed at the slave data-storage device (slave node) or at the requesting master device (requesting node). Whilst it would be possible for the read request issued by the requesting master device to comprise an indication that a "complete acknowledgement" can finally be expected by the home node once the requesting master (node) has received the requested data, i.e. the requesting node will transmit such an acknowledgement to the home node, this scheme would result in the lifetime of the entry corresponding to this transaction in the home node's tracker being given by the full round-trip latency of the data from the slave node to the requesting node and the complete acknowledgement latency from the requesting node to the home node.

In this context the present techniques provide that a direct memory transfer request sent from the apparatus to the data-storing slave device comprises a read acknowledgement trigger in response to which the data-storing slave device can transmit a read acknowledgement signal (when it can guarantee that the request is accepted and it will not send a retry message). The transaction tracking circuitry of the apparatus is then responsive to this read acknowledgement signal to deallocate the request in its tracker, i.e. mark the entry it created in response to reception of the read request from the requesting master device as complete or even just delete the entry. The lifetime of this entry in the tracker is then notably shorter than in the scenarios described above and moreover this enables the transfer of the requested data from the data-storing slave device to the requesting master device to be performed by a direct memory transfer, since there is no need for the apparatus (the hub) to be involved further. As such the read data latency is thus also improved. It is also not necessary for the requesting master device to issue a complete acknowledgement on receipt of the requested data (which would otherwise be the case for such a direct memory transfer) and this then reduces the traffic on the interconnect.

It is recognised that within a defined set of coherency protocol transactions there may be limited opportunity for additional information to be exchanged between the devices which exchange those transactions, but the present techniques have identified that where such coherency protocol transactions may be labelled with a specification of an ordering constraint (or conversely a ordering freedom), such an ordering specification may only have a defined meaning for transactions which take place between certain pairs of devices in the system. For example, a requesting master device which issues a read transaction to a hub device in a coherent interconnect system may specify that the request may be freely ordered with respect to other transactions, or conversely may specify that the ordering is constrained. On receipt of an ordered transaction the home node enforces this defined ordering by ensuring that it has observed the completion of a previous older transaction before issuing a new transaction to a slave node device. However, where the ordering is enforced by the home node, the present techniques recognise that a portion of the transactions that is used to specify this ordering may have a meaning for transactions between a requesting node and a home node, but will not have a meaning for transactions between the home node and the slave node. The present techniques therefore propose to take advantage of the situation by making additional use of this portion of the transaction, such that a transaction sent from the home node to a slave node can be interpreted to comprise a read acknowledgement trigger by reusing this portion. Accordingly, in some embodiments the read transaction comprises a specification of ordering freedom with respect to other transactions in a predetermined portion of the read transaction and the read acknowledgement trigger is comprised within a same predetermined portion of the direct memory transfer request.

The predetermined portion of the read transaction in which the ordering freedom is specified may be variously configured, but in some embodiments the read acknowledgement trigger is indicated in a sub-portion of the predetermined portion of the direct memory transfer request, and wherein the sub-portion of the predetermined portion of the read transaction has no semantic meaning to the apparatus with respect to the read transaction.

In some embodiments the predetermined portion is a bit-field of the coherency protocol transactions which is interpreted as a transaction ordering specification. This defined bit field of the coherency protocol transactions may be variously defined, but in some embodiments the bit field is a 2-bit field which is interpreted as the transaction ordering specification, a predetermined bit combination in the 2-bit field has no semantic meaning to the apparatus with respect to the read transaction, and the predetermined bit combination in the 2-bit field is the read acknowledgement trigger in the direct memory transfer request. The predetermined bit combination will therefore be understood to be a particular permutation of the four possibilities that can be represented by a 2-bit field which has no semantic meaning to the apparatus with respect to the read transaction, i.e. it may for example be defined in this specification of the coherency protocol transactions as "reserved". Other permutations of the content of the 2-bit field can of course have a well-defined meaning to the apparatus with respect to the ordering of the read transaction such as, for example, "no ordering", "request ordering", and "end point ordering".

As mentioned above, a feature of the approach taken by the present techniques is that the apparatus can mark an entry in its tracker as complete (where that entry was created in response to reception of the read transaction from the requesting master device) without having to wait for a confirmation of the completion of the data transfer from the requesting master device. However, this does not mean that a requesting master device is forbidden from including an indicator in a read transaction that such a completion acknowledgement will subsequently be issued and in some embodiments the read transaction comprises an indicator that a transaction complete signal will subsequently be issued by the requesting master device when the read transaction has completed.

The apparatus may indeed make use of such complete acknowledgement signals as a further level of verification that transactions have correctly completed in the system and for this purpose in some embodiments the transaction tracking circuitry further comprises counter circuitry to maintain a counter value, and the counter circuitry is responsive to the indicator that the transaction complete signal will subsequently be issued to increment the counter value, and the counter circuitry is responsive to the transaction complete signal to decrement the counter value. This provides a mechanism by which the apparatus can monitor the completion of such transactions, incrementing the counter when such an acknowledgement is indicated to be expected and decrementing the counter when the acknowledgement is received.

This counter value can then be made use of in a number of ways, for example in some embodiments the apparatus is responsive to the counter value indicating that the transaction complete signal is still expected, when the apparatus is preparing to enter a quiescent state, to generate an error signal. Hence, when the apparatus is preparing to enter this quiescent state, and thus all pending transactions should be completed, an error signal can be generated if the counter value indicates an outstanding, apparently incomplete, transaction. For example, although the meaning of particular counter values could be variously defined, in one example the counter value could begin at zero, be incremented above that value on the reception of transactions that indicate that a transaction complete signal will subsequently be issued, and hence a non-zero value of the counter could trigger the error signal.

Conversely, this also provides a mechanism by which the apparatus can determine that a received transaction complete signal is spurious, for example when (with the above described example configuration of a counter) a transaction complete signal is received when the counter value is already at zero. Thus in some embodiments the apparatus is responsive to reception of the transaction complete signal, when the counter value indicated that no transaction complete signal is still expected, to generate an error signal.

The transaction tracking circuitry could maintain a single counter used for all requesting master devices in the system, but in some embodiments the transaction tracking circuitry comprises multiple instances of the counter circuitry individually to maintain the counter value for more than one requesting master device. This enables the monitoring of the completion of transactions and the generation of errors to be made master device specific.

The read transaction received by the apparatus from the requesting master device may specify a particular coherency status for the data item (once received by the requesting master device and stored in its cache). The read transaction may indicate that the data item will be cached in non-shareable state. In other words the read transaction may be described as a "ReadNoSnoop" transaction. The read transaction may indicate that the data item is shareable and the requesting master device will not retain a copy. In other words the read transaction may be described as a "ReadOnce" transaction. The read transaction may indicate that all other copies of the data item are to be cleaned and invalidated from other masters' caches. In other words the read transaction may be described as a "ReadOnceCleanInvalidate" transaction. The read transaction may indicate that all other copies of the data item are to be invalidated in other masters' caches. In other words the read transaction may be described as a "ReadOnceMakeInvalid" transaction. One of ordinary skill in the art will recognise the terminology used above (i.e. "ReadNoSnoop", "ReadOnce", "ReadOnceCleanInvalidate", and "ReadOnceMakeInvalid") as coming from the AMBA® specifications provided by ARM® Limited of Cambridge, UK. It is important therefore to note that this disclosure is merely making use of known terminology to give clear examples of read transactions which may benefit from the presently disclosed techniques, but that these techniques could equally be applied to other systems and interconnect specifications.

In some example embodiments there is a method of operating an apparatus in a coherent interconnect system comprising the steps of: receiving a read transaction of a set of coherency protocol transactions from a requesting master device for a data item stored in a data-storing slave device; maintaining records of coherency protocol transactions received from the requesting master device whilst completion of the coherency protocol transactions are pending; issuing a direct memory transfer request to the data-storing slave device in response to reception of the read transaction, wherein the direct memory transfer request comprises a read acknowledgement trigger to solicit a read acknowledgement signal from the data storing slave device; and updating a record created by reception of the read transaction to indicate completion of the direct memory transfer request in response to reception of the read acknowledgement signal from the data-storing device.

In some example embodiments there is an apparatus for a coherent interconnect system comprising a requesting master device and a data-storing slave device, wherein the apparatus comprises means for receiving coherency protocol transactions from the requesting master device; means for exchanging further coherency protocol transactions with the data-storing slave device; means for maintaining records of the coherency protocol transactions received from the requesting master device whilst completion of the coherency protocol transactions are pending; means for issuing a direct memory transfer request to the data-storing slave device in response to reception of a read transaction from the requesting master device for a data item stored in the data-storing device, wherein the direct memory transfer request comprises a read acknowledgement trigger; and means for updating a record in the means for maintaining records created by reception of the read transaction corresponding to completion of the direct memory transfer request in response to reception of a read acknowledgement signal from the data-storing device.

In some example embodiments there is a data-storing slave device for a coherent interconnect system comprising: interface circuitry to exchange coherency protocol transactions with a hub device and to exchange further coherency protocol transactions with a master device; and transaction control circuitry responsive to reception of a direct memory transfer request from the hub device comprising a read acknowledgement trigger to transmit a read acknowledgement signal to the hub device and to transmit data specified in the direct memory transfer request directly to the master device.

The triggering of the read acknowledgement signal by the transaction control circuitry in response to reception of the direct memory transfer request comprising the read acknowledgement trigger may happen in various ways. For example, in some embodiments the transaction control circuitry may be arranged to transmit the read acknowledgement signal to the hub device in response to acceptance of the direct memory transfer request, when a retry is not required. In other words, the slave device may send the read acknowledgement signal as soon as it has accepted the direct memory transfer request and can guarantee that it will not reject it (i.e. issue a "Retry"). The hub device can thereby receive a very prompt indication of the acceptance of the direct memory transfer request and the updating of the record in the transaction tracking circuitry is correspondingly prompt, thus reducing the lifetime of that record in the tracker. In other embodiments the triggering may not be so immediate and a slave device may delay the response until it has completed the processing of the direct memory transfer request, and thus send the direct memory transfer data response to the requesting master device along with the read acknowledgement signal to the hub (home) device, thus simplifying the hardware logic.

In some example embodiments there is a method of operating a data-storing slave device in a coherent interconnect system comprising the steps of: receiving a direct memory transfer request from a hub device; when the direct memory transfer request comprising a read acknowledgement trigger, transmitting a read acknowledgement signal to the hub device; and transmitting data specified in the direct memory transfer request directly to the master device.

Some particular embodiments will now be described with reference to the figures.

Figure 1:
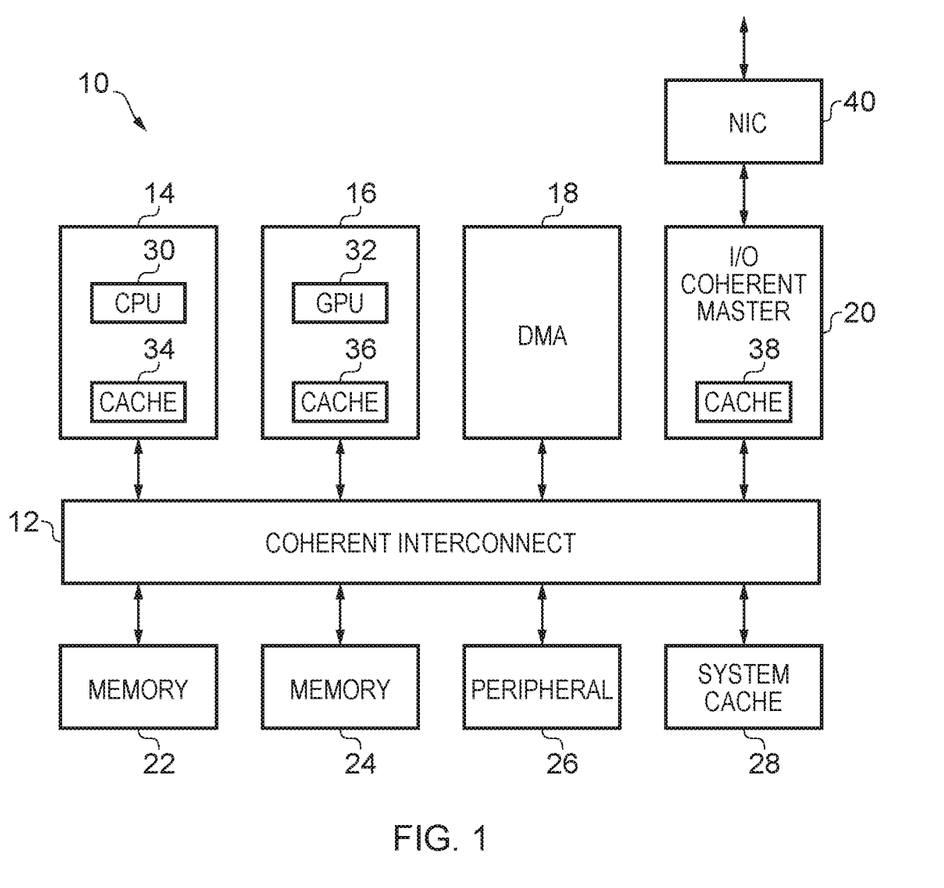
FIG. 1 schematically illustrates a data processing system comprising a coherent interconnect in one embodiment.

FIG. 1 schematically illustrates a data processing system 10 in which the present techniques are implemented in one embodiment. As can be seen from the figure this is a relatively heterogeneous system comprising a number of different master devices and a number of different slave devices, but other embodiments could equally be much more homogeneous. The master devices shown in FIG. 1 comprise a central processing device 14, a graphics processing device 16, a direct memory access device (DMA) 18, and an I/O coherent master 20. This I/O coherent master 20 provides a bridge to the network interface card (NIC) 40 for communication with a further network (not illustrated). The slave devices illustrated in the example of FIG. 1 comprise memories 22 and 24, peripheral 26, and system cache 28. Communication and data transfer between all these devices is mediated by the coherent interconnect 12, which is also variously referred to herein as a home node or a hub device.

As can also be seen in the figure, the CPU device 14 is shown to comprise a specific CPU block 30 and an associated local (i.e. L1) cache 34, the graphics processing device 16 is shown comprising a specific GPU block 32 and a local (L1) cache 36, and the I/O coherent master 20 is also provided with its own local (L1) cache 38. The communications between the illustrated devices in FIG. 1 take the form of defined format messages from a set a coherency protocol transactions which enable coherency of the multiple copies of data items stored in multiple locations around the illustrated system to be maintained. This set of coherency protocol transactions may be variously defined as is appropriate to the system under consideration, but one such suitable example is the AMBA® 5 CHI (coherent hub interface) specification provided by ARM® Limited of Cambridge UK. The techniques disclosed herein relate to the manner in which the home node handles certain read transactions received from a requesting master device, to enable those transactions to be fulfilled by means of a direct memory transfer without this imposing an increased tracking burden on the home node.

Figure 2:
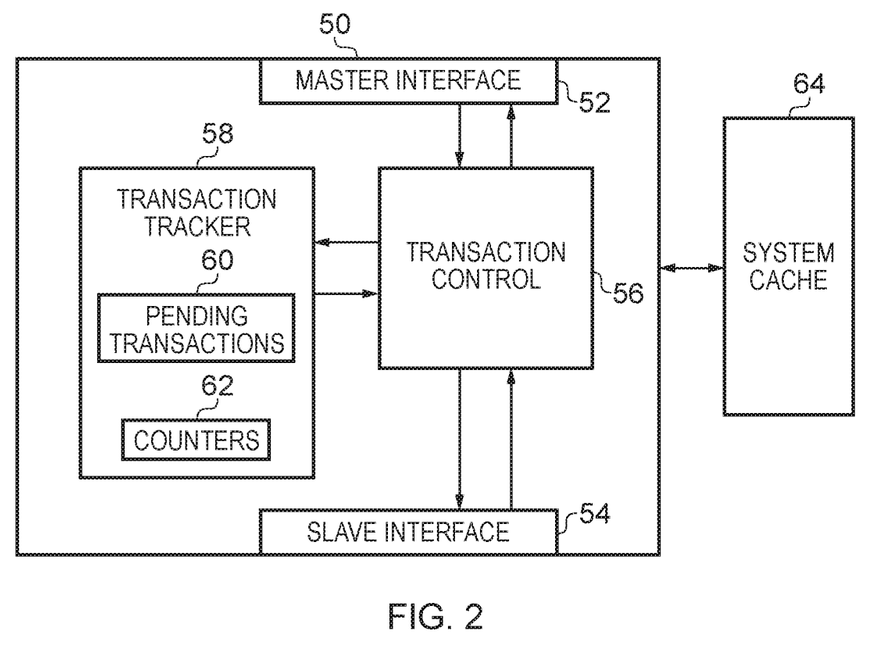
FIG. 2 schematically illustrate some components of an apparatus which can act as a hub or home device in a coherent interconnect system such as that illustrated in FIG. 1 in one embodiment.

FIG. 2 schematically illustrates an apparatus 50 in one embodiment, which may for example play the role of the coherent interconnect in the system illustrated in FIG. 1. The apparatus 50, which is also referred to here as a "home node" or "hub", comprises a master interface 52 via which it exchanges transactions with the master devices in the system and slave interface 54 via Which it exchanges transactions with the slave device. The particular transactions of relevance to the present disclosure are read transactions received from a requesting master device in the system and direct memory transfer requests issued to data-storing slave devices in the system. The apparatus 50 comprises transaction control circuitry 56 which administers overall control of the reception, processing, and issuance of transactions by the apparatus. This component also makes reference to transaction tracking circuitry 58, which is shown in the figure as comprising pending transactions circuitry 60 and counters 62. The apparatus 50 is also shown as communicating with a system cache 64 (which may for example be the system cache 28 of FIG. 1). The read transactions which the apparatus 50 receives via the master interface 52 from a requesting master device comprise a 2-bit Order field of which the 2-bit content is defined to have the following meanings with regard a request for ordering of the read transaction:

2'b00: No ordering
2'b01: Reserved
2'b10: Request ordering
2'b11: Endpoint ordering The present techniques take advantage of the fact that the bit combination 2'b01 is defined as "reserved", i.e. has no semantic meaning for the device which receives it (including the apparatus 50). On receipt of an unordered read request from a requesting master device which is suitable for implementing as a direct memory transfer request, i.e. a non-allocating read transaction such as "ReadNoSnoop", "ReadOnce", "ReadOnceCleanInvalidate", and "ReadOnceMakeInvalid") in this example of as a system based on the AMBA® specifications provided by ARM® Limited of Cambridge, UK, the transaction control 56 causes an entry to be made in the pending transactions storage 60 in the transaction tracker 58. It is important therefore to note that this disclosure is making use of known terminology to facilitate one of ordinary skill in the art's understanding, but this disclosure is then augmenting the processing of such read transaction in accordance with the techniques presented for the first time herein (i.e. to trigger a read acknowledge signal from the slave device to which it forwards a direct memory transfer request). Thus the transaction control 56 also then marks the Order field of a transaction (a direct memory transfer request) which it then issues to the slave device storing the required data to indicate that a read acknowledgement is required. This is done by overloading the above specified "reserved" bit combination of the order field with a bespoke meaning for a transaction between the apparatus 50 (the home node) and the data-storing slave (slave node) to indicate that a read acknowledgement is required. In this example the permutations of the possible bit combinations in the 2-bit Order field for a transaction between the home node and the slave node are:

2'b00: No ordering/to be treated as no read acknowledgement required
2'b01: Read acknowledgement required
2'b10: Reserved
2'b11: Reserved The slave device which receives the direct memory transfer request is arranged to recognise this "new" meaning for the 2'b01 bit combination in the Order field and to send a read receipt (i.e. a read acknowledgement), once it can guarantee that the request has been accepted and it will not send a retry. Indeed the slave device in this example sends the read acknowledgement signal (read receipt) as soon as it has accepted the direct memory transfer request (and can guarantee that it will not issue a retry). The home node hence receives a very prompt indication of the acceptance of the direct memory transfer request, to be able to deallocate the entry in its tracker. In an variant on this embodiment the slave device can configured not to send the read receipt (read acknowledgement signal) until it has completed the processing of the direct memory transfer request, and thus send the direct memory transfer data response to the requesting master device along with the read acknowledgement signal to the hub (home) device, thus simplifying the slave hardware logic. The use of the counter 62 within the transaction tracker 58 will be described in more detail below with reference to the following figures.

Figure 3:
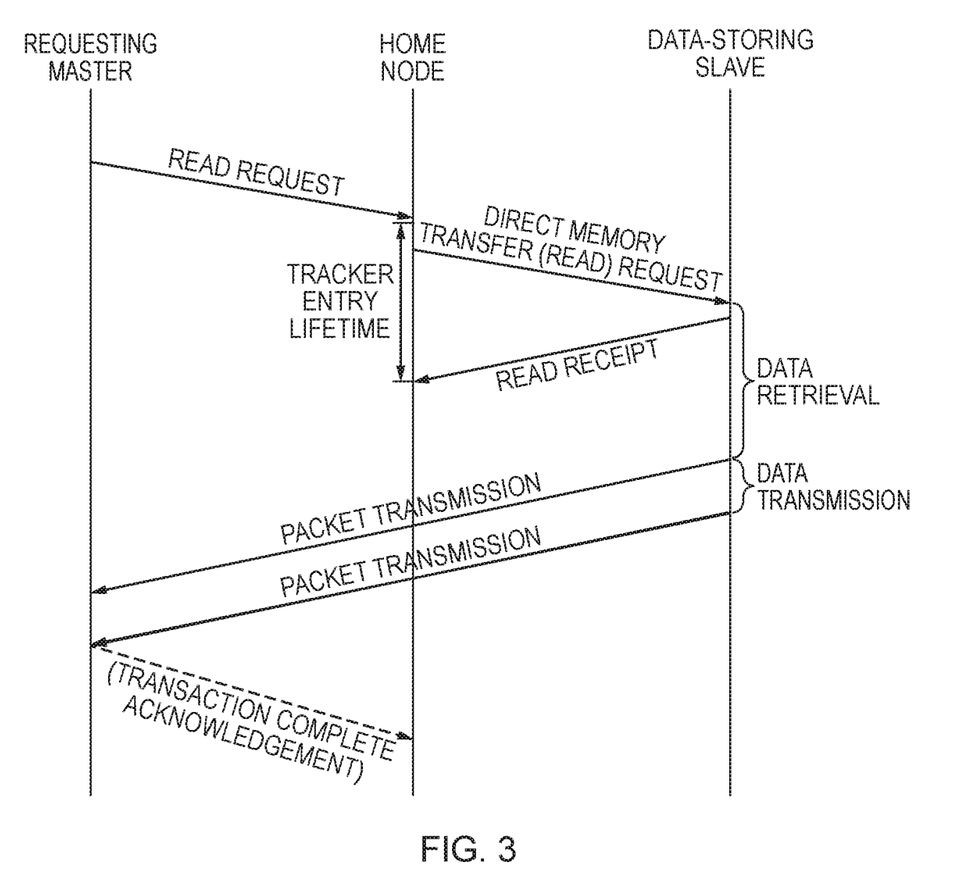
FIG. 3 shows an example set of messages exchanged between a requesting master device, a home node device, and data storing slave device in one embodiment.

FIG. 3 shows an example set of messages exchanged between a requesting master, a home node, and a data storing slave in one embodiment. Initially the requesting master sends a read request to the home node specifying one or more data items which it requires. On receipt of this the home node makes an entry in its transaction tracker and then issues a direct memory transfer (read request) to the data-storing slave where the data item(s) is stored. This request is marked with the above mentioned particular bit combination (2'b01) in its Order field, indicating that a read acknowledgement it required. Thus, in response to reception of this request the data-storing slave issues a read receipt to the home node. Note that (as mentioned above) the data storing slave may be arranged to issue this read receipt essentially immediately (when it has accepted the direct memory transfer request, and it is known that a retry will not occur) or it can be set up to only send the read receipt once the direct memory transfer has been processed. Having received the receipt, the home node then marks the entry it created in the tracker as complete (as though the full transaction has now completed). The data storing slave retrieves the required data from its storage and then transmits this directly to the requesting master without going via the home node. The figure shows that the transmission of this data may take place via more than one transmission (e.g. multiple packets). Finally the dashed communication line in FIG. 3 shows that the requesting master may additionally issue a transaction complete acknowledgement to the home node when the requested data has been fully received. Where the requesting master has indicated in the initial read request that such a completion acknowledgement can be expected (ExpCompAck=1) the home node may increment a corresponding counter (such as one of the counters 62 shown in FIG. 2) and on receipt of the transaction complete acknowledgement decrement this counter. This will be described in more detail below.

Figure 4:
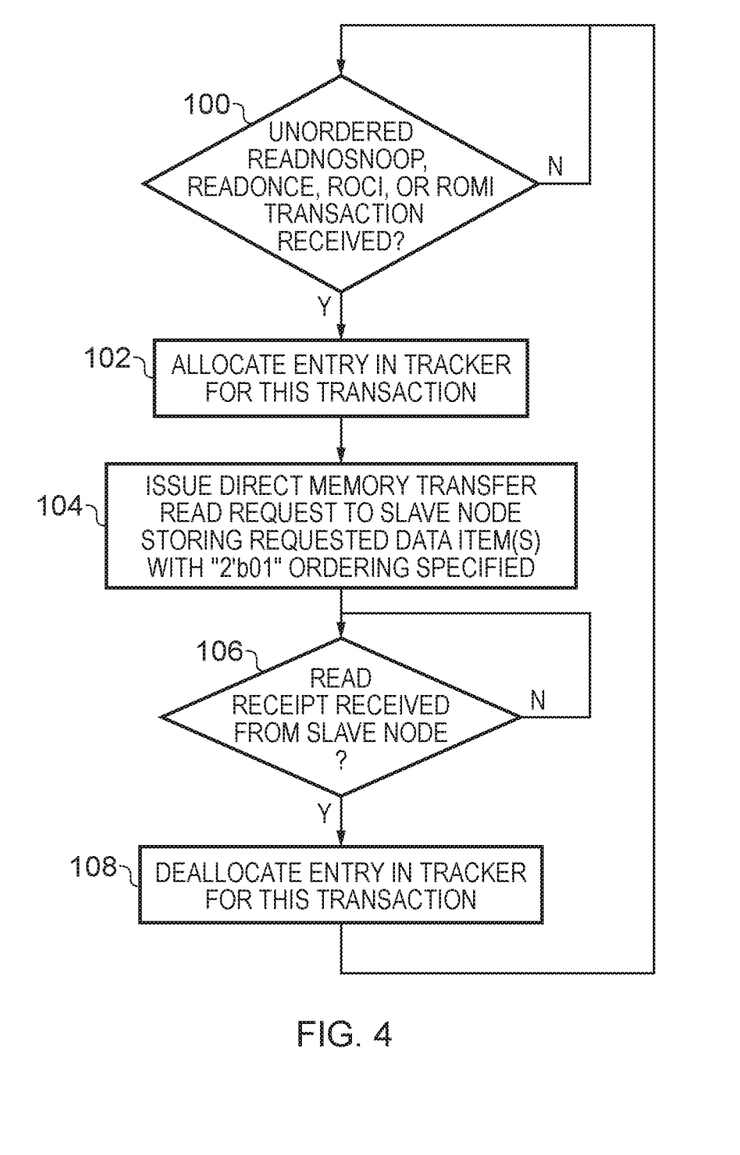
FIG. 4 shows a set of steps which are taken according to the method of one embodiment.

FIG. 4 shows a sequence of steps which are taken in one embodiment by the home node in operation. The flow can be considered to begin at step 100 where it is determined if an unordered ReadNoSnoop, ReadOnce, ReadOnceCleanInvalidate, or ReadOnceMakeInvalid transaction has been received. Whilst it has not the flow waits at this stage. On receipt of one of these types of transaction the flow proceeds to step 102, where the home node causes the allocation of an entry in the tracker for this transaction. Then at step 104 the home node issues a direct memory transfer request to a slave node in the system where the requested data item(s) are stored with the bits of the Order field set as 2b'01, where this bit combination has no meaning with regard to the specification of an ordering constraint, but will be understood by the recipient slave node to indicate that a read receipt should be generated. Then the flow waits at step 106 until the corresponding read receipt has been received from the slave node and finally when it has the entry in the tracker for this transaction is deallocated (i.e. marked as complete) at step 108. The flow then returns to step 100.

Figure 5:
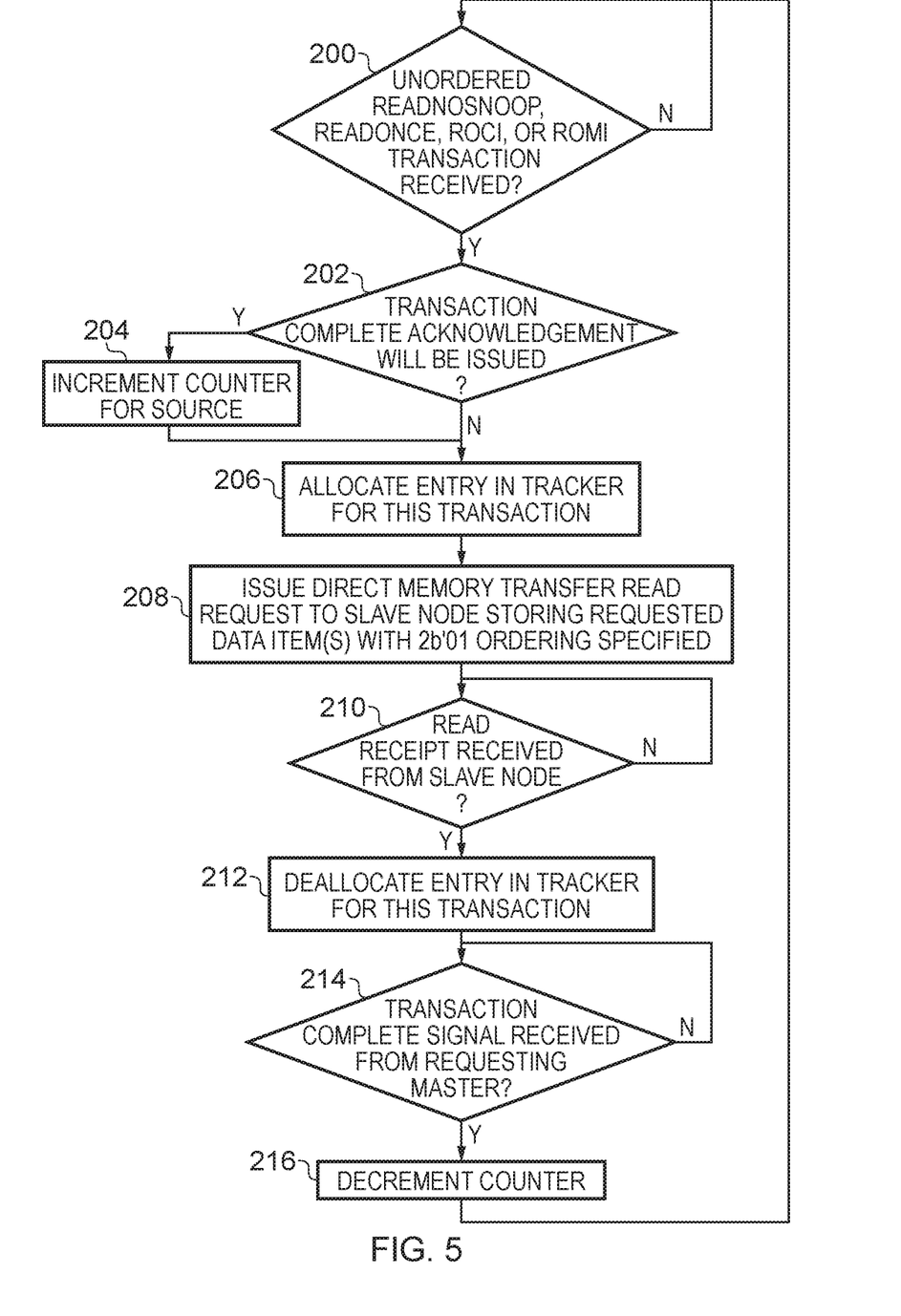
FIG. 5 shows a set of steps which are taken according to the method of one embodiment.

FIG. 5 shows a sequence of steps which are taken in operation of the home node in one embodiment. The flow can be considered to begin at step 200, where the flow waits until an unordered ReadNoSnoop, ReadOnce, ReadOnceCleanInvalidate, or ReadOnceMakeInvalid transaction is received. The flow then proceeds to step 202 where it is determined if the read transaction received indicates that a transaction complete acknowledgement will subsequently be issued by the requesting master device, if this is the case (i.e. when ExpCompAck=1 in the read transaction) then the flow proceeds via step 204, where the home node increments a counter for the requesting master device. Otherwise (i.e. when ExpCompAck=0 in the read transaction) the flow proceeds directly to step 206. At this step an entry is allocated in the tracker for this transaction and then at step 208 the home node issues a direct memory transfer (read) request to the slave node where the requested data item(s) is stored with the bits of the Order field set as 2b'01. The flow then waits at step 210 until the corresponding read receipt is received from the slave node and then at step 212 the entry in the tracker for this transaction is deallocated. Next at step 214 it is determined if the home node has received a transaction complete signal from the requesting master device and the flow loops on itself here until this is the case and then at step 216 the counter for the requesting master device is decremented and the flow returns to step 200.

Figure 6A:
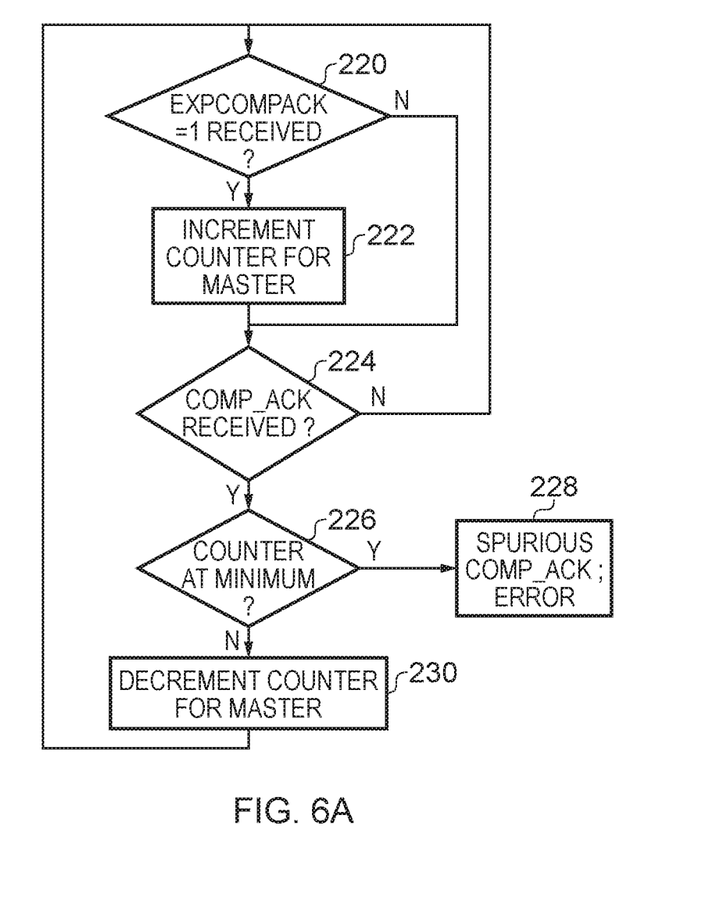
FIG. 6A shows a set of steps which are taken to decrement a counter in response to a complete acknowledgement in one embodiment.
Figure 6B:
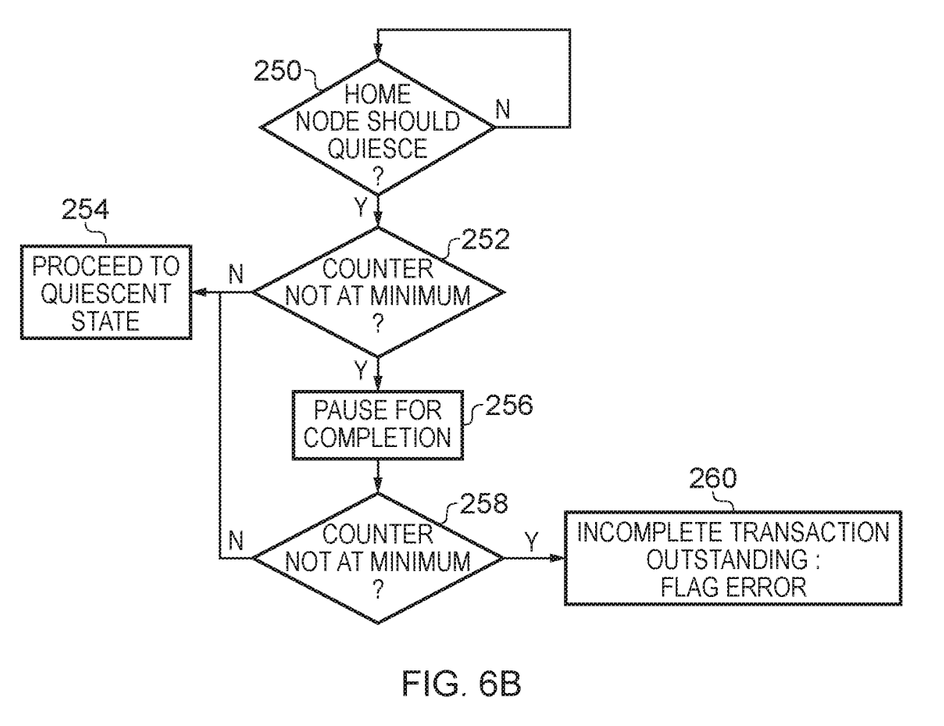
FIG. 6B shows a set of steps which are taken when a home node device should enter a quiescent state in one embodiment.

FIG. 5 shows the incrementing and decrementing of the counter corresponding to the requesting master only when this is operating normally, and (merely for clarity of illustration in that figure) does not illustrate how the home node responds when a possible update of the counter value in response to a received signal indicates a possible error in the system. Two examples of this are shown in FIGS. 6A and 6B. FIG. 6A shows one manner in which an error signal may be generated by the home node. The flow can be considered to begin at step 220 where it is determined if a unordered read transaction with ExpCompAck=1 has been received. If it has then the flow proceeds via step 222 where the counter for the requesting master is incremented. Then at step 224 it is determined if a Comp_Ack signal (i.e. a transaction complete acknowledgement) has been received. If not then the flow returns to step 220. If however a Comp_Ack signal is received then the flow proceeds to step 226, where it is determined if the counter for the relevant master is already at a predetermined minimum (e.g. zero). If it is and therefore further decrementing of this counter is not possible, then the flow proceeds to step 228 since a spurious Comp_Ack signal has been received and an error can be flagged. Put otherwise, in reaching this point in the flow diagram the home node has observed more transaction complete acknowledgements than indications that such transaction complete acknowledgements are to be expected. Otherwise at step 230 the counter for this master is decremented and the flow returns to step 220.

FIG. 6B shows an example of the manner via which a home node may seek to enter a quiescent state. The flow can be considered to begin at step 250 where the flow waits until it is determined that the home node should seek to enter a quiescent state. Then at step 252 it is determined if any counter which the home node maintains for a master in the system is not at its predetermined minimum, i.e. indicating that at least one transaction complete acknowledgement is still expected. If there are no counters which are not at their minimum then the flow proceeds to step 254 where the home node can continue into the quiescent state. If however at least one counter is not at its minimum value then the flow proceeds to step 256 where the home node pauses for an appropriate period (according to the particular system) to allow completion of pending transactions and it is then again determined at step 258 if any counter is not at its predetermined minimum value. If all counters have now reached their minimum then the flow can proceed to step 254 and the system can enter its quiescent state, but otherwise the flow proceeds to step 260 since a transaction complete acknowledgement is still outstanding and this error can be flagged.

In brief overall summary an apparatus and a corresponding method of operating the apparatus, in a coherent interconnect system comprising a requesting master device and a data-storing slave device, are provided. The apparatus maintains records of coherency protocol transactions received from the requesting master device whilst completion of the coherency protocol transactions are pending and is responsive to reception of a read transaction from the requesting master device for a data item stored in the data-storing slave device to issue a direct memory transfer request to the data-storing slave device. A read acknowledgement trigger is added to the direct memory transfer request and in response to reception of a read acknowledgement signal from the data-storing slave device a record created by reception of the read transaction is updated corresponding to completion of the direct memory transfer request. The lifetime that the apparatus needs to maintain the record is thus reduced, despite the read transaction being satisfied by a direct memory transfer. A corresponding data-storing slave device and method of operating the data-storing slave device are also provided.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Apparatus for a coherent interconnect system comprising:

interface circuitry to receive coherency protocol transactions from a requesting master device and to exchange further coherency protocol transactions with a data-storing slave device;

transaction tracking circuitry to maintain records of the coherency protocol transactions received from the requesting master device whilst completion of the coherency protocol transactions are pending; and transaction control circuitry responsive to reception at the interface circuitry of a read transaction of the coherency protocol transactions from the requesting master device for a data item stored in the data-storing slave device to issue a direct memory transfer request to the data-storing slave device, wherein the direct memory transfer request comprises a read acknowledgement trigger to solicit a read acknowledgement signal from the data-storing slave device, and wherein the transaction tracking circuitry is responsive to reception at the interface circuitry of the read acknowledgement signal from the data-storing slave device to update a record in the transaction tracking circuitry created by reception of the read transaction to indicate completion of the direct memory transfer request.

2. The apparatus as claimed in claim 1, wherein the read transaction comprises a specification of ordering freedom with respect to other transactions in a predetermined portion of the read transaction and the read acknowledgement trigger is comprised within a same predetermined portion of the direct memory transfer request.

3. The apparatus as claimed in claim 2, wherein the read acknowledgement trigger is indicated in a sub-portion of the predetermined portion of the direct memory transfer request, and wherein the sub-portion of the predetermined portion of the read transaction has no semantic meaning to the apparatus with respect to the read transaction.

4. The apparatus as claimed in claim 2, wherein the predetermined portion is a bit-field of the coherency protocol transactions which is interpreted as a transaction ordering specification.

5. The apparatus as claimed in claim 4, wherein the bit field is a 2-bit field which is interpreted as the transaction ordering specification, a predetermined bit combination in the 2-bit field has no semantic meaning to the apparatus with respect to the read transaction, and the predetermined bit combination in the 2-bit field is the read acknowledgement trigger in the direct memory transfer request.

6. The apparatus as claimed in claim 1, wherein the read transaction comprises an indicator that a transaction complete signal will subsequently be issued by the requesting master device when the read transaction has completed.

7. The apparatus as claimed in claim 6, wherein the transaction tracking circuitry further comprises counter circuitry to maintain a counter value, and the counter circuitry is responsive to the indicator that the transaction complete signal will subsequently be issued to increment the counter value, and the counter circuitry is responsive to the transaction complete signal to decrement the counter value.

8. The apparatus as claimed in claim 7, wherein the apparatus is responsive to the counter value indicating that the transaction complete signal is still expected, when the apparatus is preparing to enter a quiescent state, to generate an error signal.

9. The apparatus as claimed in claim 7, wherein the apparatus is responsive to reception of the transaction complete signal, when the counter value indicated that no transaction complete signal is still expected, to generate an error signal.

10. The apparatus as claimed in claim 7, wherein the transaction tracking circuitry comprises multiple instances of the counter circuitry individually to maintain the counter value for more than one requesting master device.

11. The apparatus as claimed in claim 1, wherein the read transaction indicates that the data item will be cached in non-shareable state.

12. The apparatus as claimed in claim 1, wherein the read transaction indicates that the data item is shareable and the requesting master device will not retain a copy.

13. The apparatus as claimed in claim 12, wherein the read transaction indicates that all other copies of the data item are to be cleaned and invalidated from other masters' caches.

14. The apparatus as claimed in claim 12, wherein the read transaction indicates that all other copies of the data item are to be invalidated in other masters' caches.

15. A method of operating an apparatus in a coherent interconnect system comprising the steps of:
    receiving a read transaction of a set of coherency protocol transactions from a requesting master device for a data item stored in a data-storing slave device;
    maintaining records of coherency protocol transactions received from the requesting master device whilst completion of the coherency protocol transactions are pending;
    issuing a direct memory transfer request to the data-storing slave device in response to reception of the read transaction, wherein the direct memory transfer request comprises a read acknowledgement trigger to solicit a read acknowledgement signal from the data-storing slave device; and
    updating a record created by reception of the read transaction to indicate completion of the direct memory transfer request in response to reception of the read acknowledgement signal from the data-storing device.

16. A data-storing slave device for a coherent interconnect system comprising:
    interface circuitry to exchange coherency protocol transactions with a hub device and to exchange further coherency protocol transactions with a master device; and
    transaction control circuitry responsive to reception of a direct memory transfer request from the hub device comprising a read acknowledgement trigger to transmit a read acknowledgement signal to the hub device and to transmit data specified in the direct memory transfer request directly to the master device.

17. The data-storing slave device as claimed in claim 16, wherein the transaction control circuitry is arranged to transmit the read acknowledgement signal to the hub device in response to acceptance of the direct memory transfer request, when a retry is not required.

18. A method of operating a data-storing slave device in a coherent interconnect system comprising the steps of:
    receiving a direct memory transfer request from a hub device;
    when the direct memory transfer request comprises a read acknowledgement trigger, transmitting a read acknowledgement signal to the hub device; and
    transmitting data specified in the direct memory transfer request directly to a master device communicatively coupled to the hub device and the data-storing slave device.

* * * * *